(12) United States Patent
Brissot et al.

(10) Patent No.: US 7,639,941 B2
(45) Date of Patent: Dec. 29, 2009

(54) COMPACT PHOTOGRAPHING DEVICE

(75) Inventors: Louis Brissot, Saint Egreve (FR);
Romain Ramel, Saint Egreve (FR)

(73) Assignee: Atmel Grenoble (FR)

( * ) Notice: Subject to any disclaimer, the term of this patent is extended or adjusted under 35 U.S.C. 154(b) by 296 days.

(21) Appl. No.: 10/576,462

(22) PCT Filed: Oct. 15, 2004

(86) PCT No.: PCT/EP2004/052558

§ 371 (c)(1),
(2), (4) Date: Apr. 20, 2006

(87) PCT Pub. No.: WO2005/038503

PCT Pub. Date: Apr. 28, 2005

(65) Prior Publication Data

US 2007/0035823 A1 Feb. 15, 2007

(30) Foreign Application Priority Data

Oct. 21, 2003 (FR) .................................. 03 12295

(51) Int. Cl.
*G03B 35/00* (2006.01)
(52) U.S. Cl. ....................................... 396/327; 348/335

(58) Field of Classification Search ................. 396/119,
396/268, 272, 333, 351, 459, 326, 327; 348/266,
348/369; 359/419, 482
See application file for complete search history.

(56) References Cited

U.S. PATENT DOCUMENTS

| 5,692,226 | A  | * | 11/1997 | Hall ............................ 396/326 |
| 5,727,239 | A  | * | 3/1998  | Hankawa et al. ............. 396/111 |
| 6,370,960 | B1 | * | 4/2002  | Igel et al. ....................... 73/724 |
| 6,459,490 | B1 |   | 10/2002 | Kuhn et al. |
| 7,098,953 | B2 | * | 8/2006  | Inoue et al. .................. 348/335 |
| 2001/0015847 | A1 | * | 8/2001 | Sugawara ................... 359/462 |
| 2002/0025155 | A1 | * | 2/2002 | Uchiyama et al. ........... 396/111 |
| 2002/0105734 | A1 | * | 8/2002 | Kimura et al. ............... 359/729 |
| 2003/0103267 | A1 |   | 6/2003 | Kasahara |
| 2003/0227696 | A1 | * | 12/2003 | Maker ........................ 359/850 |

FOREIGN PATENT DOCUMENTS

DE 10 16 033 B 9/1957
EP 0 905 539 A 3/1999

OTHER PUBLICATIONS

Patent Abstract of Japan vol. 1995, No. 11, Dec. 26, 1995.

* cited by examiner

*Primary Examiner*—Melissa J. Koval
*Assistant Examiner*—Autumn Parker
(74) *Attorney, Agent, or Firm*—Lowe Hauptman Ham & Berner, LLP

(57) ABSTRACT

The invention relates to a photographing device whose bulk is intended to be reduced. According to the invention, a permanent division of the object field observed by the device is associated with a catadioptric configuration.

10 Claims, 4 Drawing Sheets

COMPACT PHOTOGRAPHING DEVICE

BACKGROUND OF THE INVENTION

The invention relates to an image pickup device. Attempts are increasingly being made to reduce the bulk of photographing devices. This need is particularly great, for example, when wishing to integrate such a device in a mobile telephone in order to add a video recorder or photographic function to the telephone function.

To this end, photographing devices are produced which comprise a sensor produced on an electronic component, on top of which there are optical means. For example, such a photographing device has a horizontal object field of 50° and a matricial sensor comprising 640 points per row and 480 points per column, which is well known by the name VGA (video graphics array) sensor. The optical means then need to have a minimum focal length of 3.8 mm. Using only a converging lens to produce the optical means, it is impossible to reduce the height of the optical means as measured along the optical axis of the lens to less than the focal length, i.e. 3.8 mm. In practice, such optical means have a height of not less than 6 mm. This is because the thickness of the lens tends to lengthen the optical path. In order to reduce the thickness of the optical means, a diverging lens may be arranged between the converging lens and the sensor. In practice, such an embodiment does not make it possible to reduce the thickness of the optical means to less than 5 mm.

Furthermore, a photographing device in the VGA format having a horizontal object field of 50° in reality has a total object field of 66° as measured along the diagonal of the sensor. This wide field leads to aberrations which are commensurately greater as the aperture is large. Lenses whose surfaces are aspherical are used in order to correct the field aberrations. However, the use of this type of lens imposes tight positioning tolerances of the lens between one another and with respect to the sensor. For example, for a photographing device whose total object field is 66° and whose maximum aperture is 2.8, the positioning precision of the lenses must be less than 15 μm. Such a precision is extremely difficult to obtain when wishing to mass produce the photographing device at a small production cost.

SUMMARY OF THE INVENTION

It is an object of the invention to overcome these problems by providing a compact photographing device having a large field.

To this end, the invention relates to a photographing device comprising a sensor and optical means through which the device receives light radiation in an object field and directs it toward the sensor, characterized in that the optical means comprise at least one mirror and a plurality of entry pupils, each observing a part of the object field, and in that the light radiation observed by each pupil is directed toward a separate part of the sensor by the optical means.

BRIEF DESCRIPTION OF THE DRAWING

The invention will be understood more clearly, and other advantages will become apparent, on reading the description of an embodiment given by way of example and illustrated by the appended drawings, in which.

DETAILED DESCRIPTION OF THE PREFERRED EMBODIMENT

Figure 1:
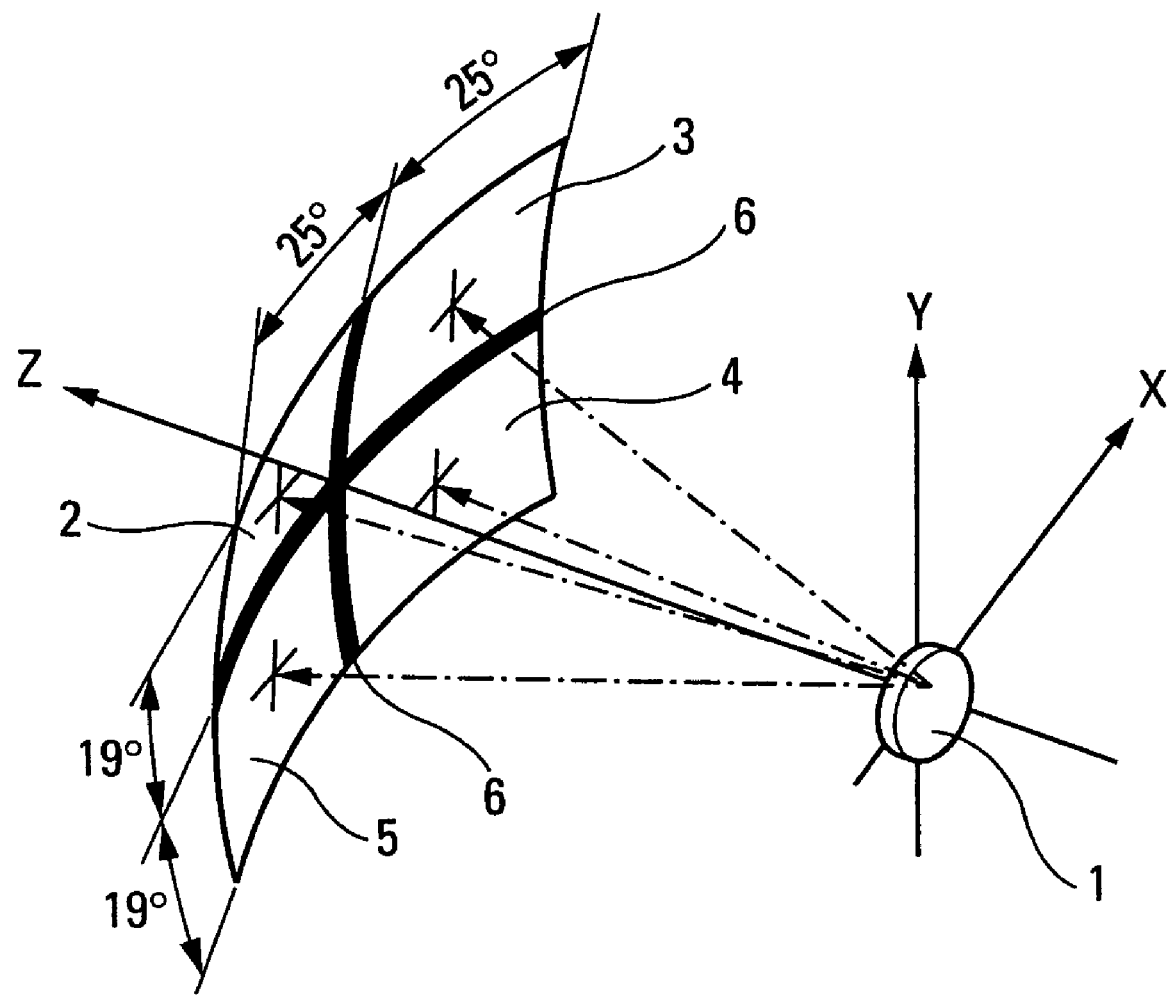
FIG. 1 represents a division of the object field of the optical means.

The invention is described with reference to a photographing device in the VGA format having a horizontal object field of 50° and a vertical object field of 38°. The invention may of course be employed for other photographing device formats and for any angular dimension of the object field. A device according to the invention comprises a sensor and optical means 1 through which the device receives light radiation in the object field and directs it toward the sensor. Only the optical means 1 and the associated object field are represented in FIG. 1. The object field observed by the optical means 1 is centered around an axis z. The optical means 1 observe an object field centered around an axis z. The object field extends over 50° in a horizontal plane formed by an axis x and the axis z. The object field extends over 38° in a vertical plane formed by an axis y and the axis z. The axes x, y and z form an orthogonal reference frame. According to the invention, the object field is divided into a plurality of parts. In the example represented in FIG. 1, the object field is divided into four equal parts 2 to 5, each lying in a quadrant of a plane defined by the axes x and y. Each part has a horizontal field of 25° and a vertical field of 19°. The optical axis of each part is represented by dots and dashes in FIG. 1. Since the angular dimensions of each part are smaller than the angular dimensions of the complete field, production of the optical means is thereby facilitated. This advantage is commensurately greater as the maximum aperture of the entry pupil is large.

The various parts 2 to 5 of the object field advantageously overlap partially. This overlap makes it possible to facilitate reconstruction of the complete image of the object field. This reconstruction is not dealt with in detail here; it may be carried out by computational means by comparing overlap zones 6 of each part 2 to 5.

Figure 2:
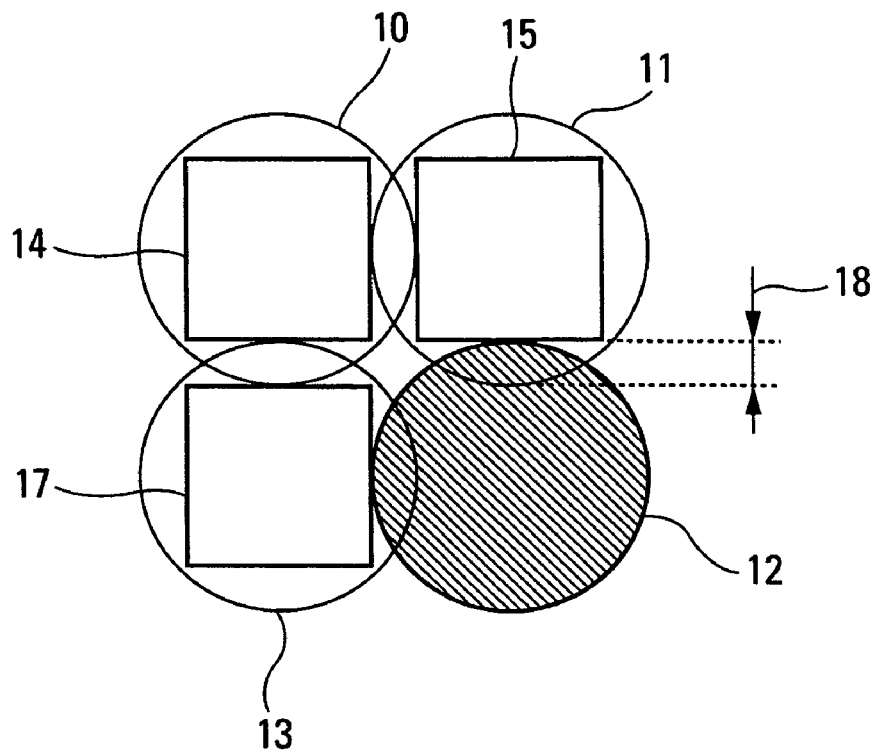
FIG. 2 represents an image plane associated with the object field by the optical means.
Figure 3:
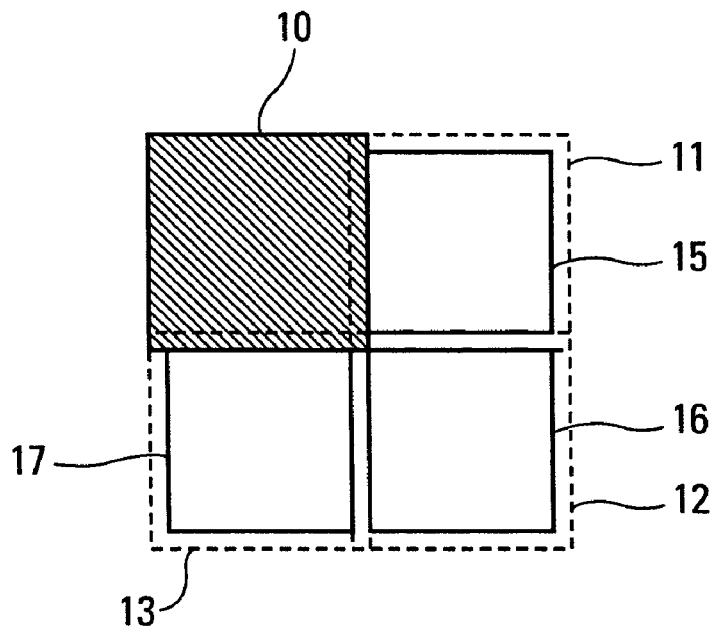
FIG. 3 represents an image plane associated with the object field by the optical means, the entry pupils of which have a square geometry.

FIG. 2 represents an image plane associated with the object field by the optical means 1. The image plane is formed on the sensor, which will be described below. The image plane is divided into four parts 10 to 13, each corresponding to one of parts 2 to 5 of the object field. An entry pupil centered on one of the optical axes represented by dots and dashes in FIG. 1 is associated with each part of the object field. The entry pupils are circular, for example, and the image of their circumference is found on the image plane. Nevertheless, only the surface inside a square circumscribed by the circle will be used in order to reconstruct the complete image of the object field. This square surface is referred to as the useful part of the image plane. In the example represented in FIG. 2, four useful parts 14 to 17 correspond respectively to the four parts 10 to 13 of the image plane. In the embodiment of the device, a space 18 is provided which separates the various useful parts 14 to 17 and prevents one of the parts 10 to 13 of the image plane from covering one of four useful parts 14 to 17. The entry pupils advantageously have a geometry similar to those of the useful parts 14 to 17. In the case in point, if the useful parts have a square geometry, entry pupils will be used which are also square. This square geometry is represented in FIG. 3 where, for the sake of simplicity, the same references are used as in FIG. 2. By adapting the geometries of the entry pupils and the useful parts, it is possible to reduce the dimensions of the space 18 and therefore those of a sensor receiving the light radiation observed in the object field by the optical means 1. Other entry pupil geometries are of course possible, for example a hexagonal geometry.

Figure 4:
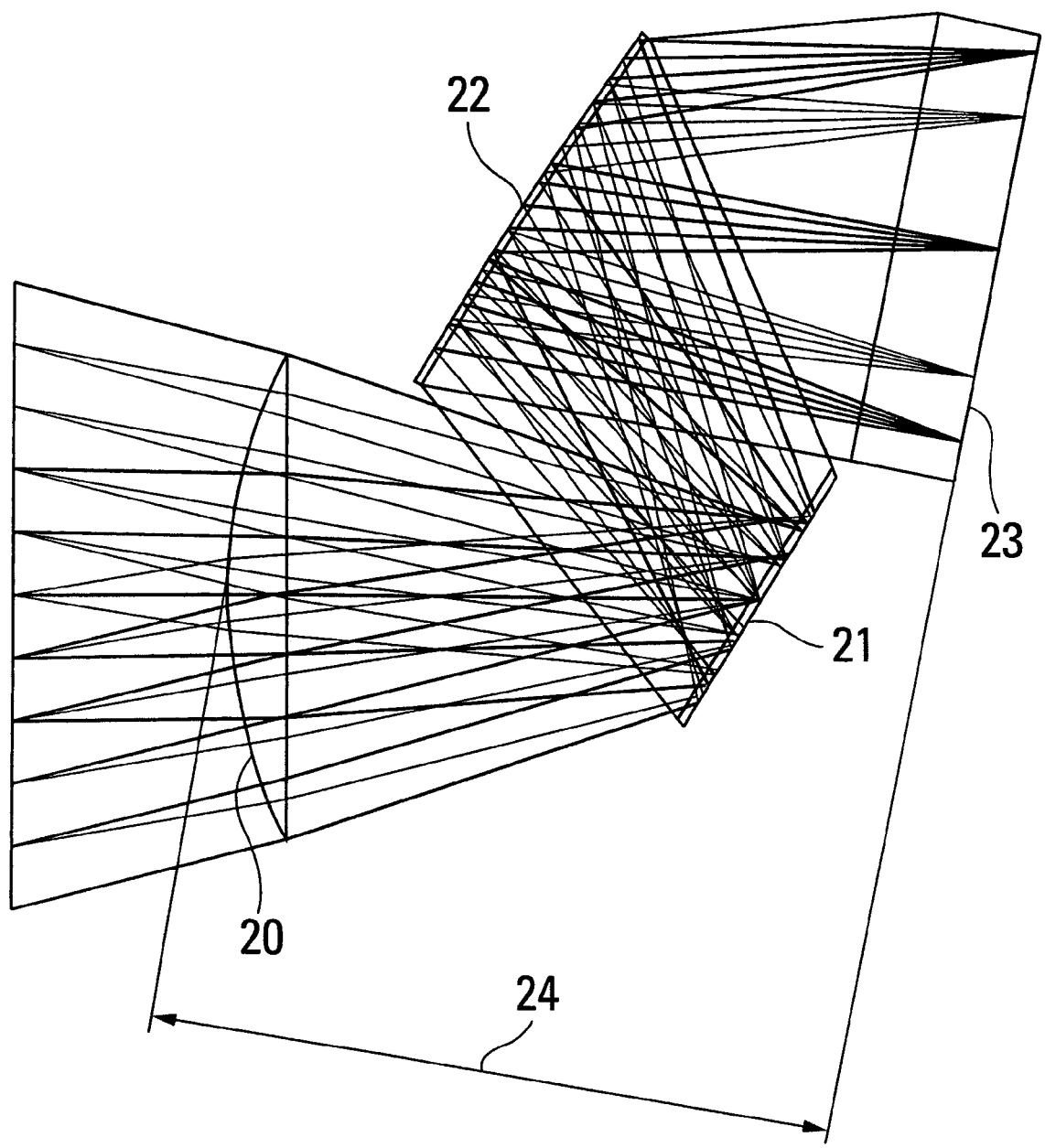
FIG. 4 represents a catadioptric configuration associated with an entry pupil.

FIG. 4 represents the optical path followed by radiation passing through one of the entry pupils 20. The device furthermore comprises two mirrors 21 and 22 associated with the entry pupil 20, as well as a sensor 23. More generally, the optical means 1 comprise at least two mirrors, in the case in point 21 and 22, associated with each part of the object field. This optical configuration, referred to as catadioptric, makes it possible to fold the optical path and therefore greatly reduce the overall bulk of the device, a bulk for which the dimension 24 is representative. The catadioptric configuration is achievable in practice only for a small field, which is why the invention consists in associating the division of the object field and a catadioptric configuration. An optical path folded with the aid of more than two mirrors may be envisaged, for example three, four or five mirrors associated with each part of the object field. By folding the optical path in this way, the bulk of the device is reduced further.

Figure 5:
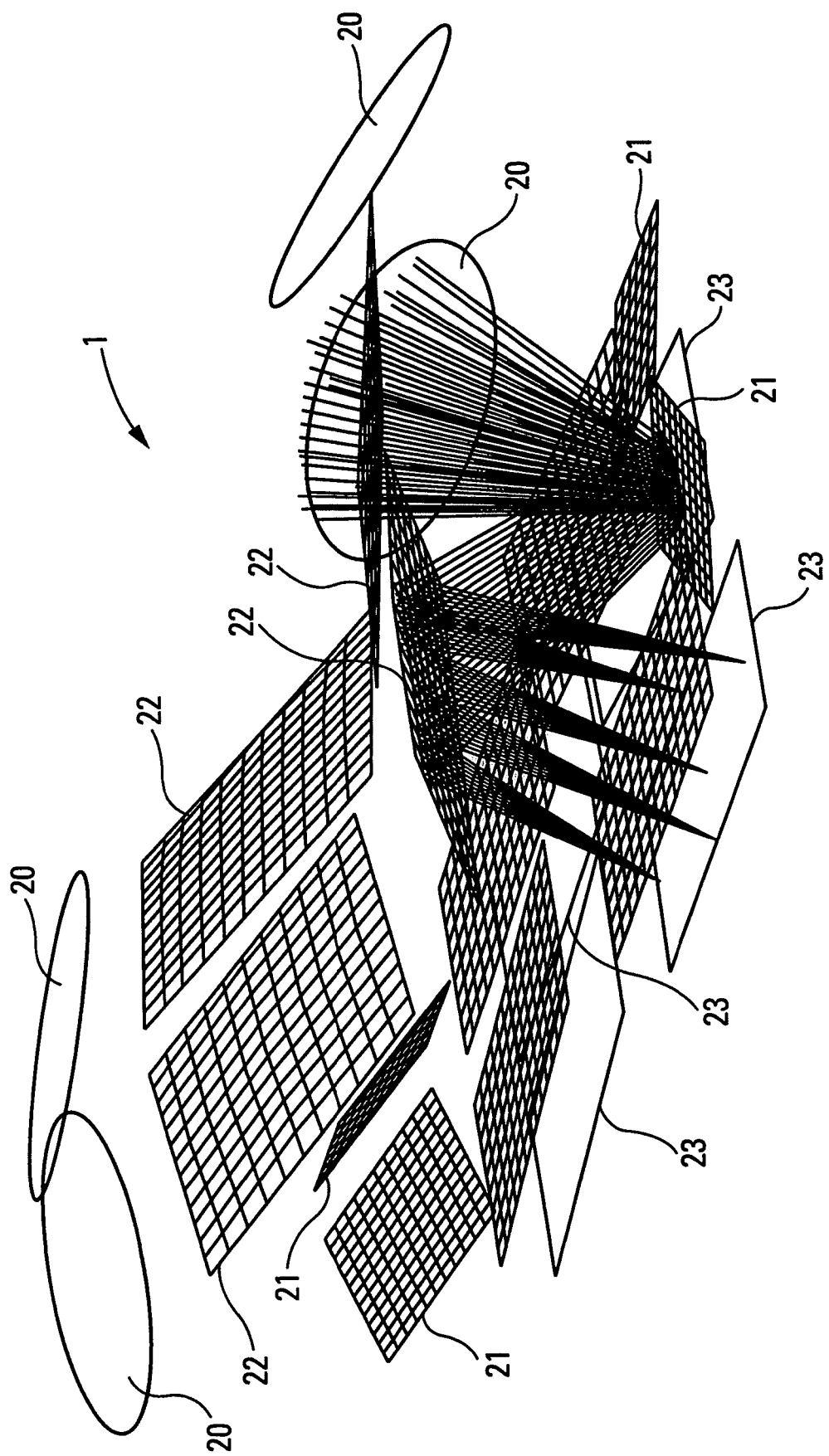
FIG. 5 represents the repetition of the catadioptric configuration for four entry pupils.

FIG. 5 makes it possible to visualize the repetition of the configuration described with the aid of FIG. 4 as many times as the division of the object field. In FIG. 5, the field has been divided into four parts each associated with an entry pupil 20, and the catadioptric configuration described with the aid of FIG. 4 has been repeated four times. To facilitate comprehension, the references of FIG. 4 have been given four times.

The four sensors 23 appear separate in FIG. 5. It is of course possible to group them on a single electronic component, for example comprising a sensor of the CMOS type. The electronic component is then produced on a single substrate, for example of silicon. In order to avoid losing substrate area, signal processing means, for example decoding of row and column addresses, may advantageously be positioned in the space 18 between the useful parts.

Advantageously, the light radiation observed by each pupil 20 is constantly directed towards a separate part of the sensor 23 by the optical means 1. This avoids any sequential device in the optical path between the pupils and the sensor. Such a sequential device would limit the sensitivity of the sensor and the choice of processing frequency of the sensor.

Advantageously, the optical means 1 formed by the entry pupils 20 and the mirrors 21 and 22 may be produced in a single transparent piece, the surfaces of which forming the mirrors 21 and 22 are treated in order to be reflective. The transparent piece is, for example, made of polycarbonate or polymethyl methacrylate. This single piece is then fixed by adhesive bonding on the electronic component comprising the sensor 23.

Advantageously, the optical means 1 comprise at least one element with negative optical power. This element makes it possible to reduce the length of the optical path between the entry pupil 20 and the sensor 23. This makes it possible to further reduce the bulk of the device by reducing the dimension 24 represented in FIG. 4. The element with negative optical power is, for example, one of the mirrors 21 or 22 or alternatively a diverging lens placed between the entry pupil 20 and the mirror 21.

The fact that the object field is divided presents numerous advantages. For given optical means 1, it can be shown that the geometrical distortion increases with the field. For a horizontal object field of 50°, for example, a distortion of the order of 4% may be expected. For the same optical means 1, by dividing the object field in two, the geometrical distortion remains much less than 1%. Another advantage connected with the division of the field is the improvement of the telecentricity at the sensor 23. It will be recalled that the telecentricity represents the difference between the incidence of radiation illuminating the sensor 23 and normal incidence on this same sensor 23. The telecentricity increases with the field and certain types of sensors, for example CMOS sensors, are sensitive to the incidence of the radiation which they receive. Their dynamic range decreases when the incidence departs from normal incidence. Dividing the object field reduces the telecentricity of the radiation reaching the sensor 23, which then retains a better dynamic range over its entire surface. Dividing the field likewise improves the contrast as a function of the spatial frequency of the radiation. As before, the contrast decreases with the object field. Dividing the object field therefore improves the contrast as a function of the spatial frequency of the radiation.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An image pickup device comprising:
a sensor means and an optical means through which the device receives light radiation in an object field and directs it toward the sensor means,
wherein the optical means comprise at least one mirror and a plurality of entry pupils, each said entry pupil for observing a distinct part of the object field,
wherein the height of the optical means is less than the focal length for the entry pupils,
wherein the light radiation to be observed by each said pupil is reflected by one of the at least one mirror toward a separated part of the sensor means by the optical means.

2. The device as claimed in claim 1, wherein the various parts of the object field partially overlap.

3. The device as claimed in claim 1, wherein each part of the object field is associated with a useful part of an image plane formed on the sensor means by the optical means, and in that the various useful parts are separated by a space.

4. The device as claimed in claim 3, wherein the sensor means is produced on a substrate, and wherein signal processing means are produced in the space on the substrate.

5. The device as claimed in claim 1, wherein each part of the object field is associated with a useful part of an image plane formed on the sensor means by the optical means, and wherein the entry pupils have a geometry similar to that of the useful parts.

6. The device as claimed in claim 1, wherein the optical means comprise at least one element with negative optical power.

7. The device as claimed in claim 6, wherein the light radiation observed by each pupil is constantly directed toward a separate part of the sensor means by the optical means.

8. The device as claimed in claim 1, wherein the optical means are produced in a single transparent piece.

9. The device as claimed in claim 1, wherein the optical means comprise at least two mirrors associated with each part of the object field.

10. An image pickup device comprising:

a sensor means and an optical means through which the device receives light radiation in an object field and directs it toward the sensor means, wherein the optical means comprise at least one mirror and a plurality of entry pupils, each said entry pupil for observing a distinct part of the object field, wherein the light radiation to be observed by each said pupil is directed toward a separated part of the sensor means by the optical means, wherein the optical means are produced in a single transparent piece.

* * * * *